(12) United States Patent
Queveau et al.

(10) Patent No.: US 7,255,385 B2
(45) Date of Patent: Aug. 14, 2007

(54) CONVERTIBLE ROOF FOR VEHICLE AND ASSOCIATED VEHICLE

(75) Inventors: Gerard Queveau, Le Pin (FR); Paul Queveau, Montravers (FR); Jean-Marc Guillez, Cirieres (FR)

(73) Assignee: Heuliez (FR)

( * ) Notice: Subject to any disclaimer, the term of this patent is extended or adjusted under 35 U.S.C. 154(b) by 213 days.

(21) Appl. No.: 10/531,654

(22) PCT Filed: Oct. 17, 2003

(86) PCT No.: PCT/FR03/03077

§ 371 (c)(1),
(2), (4) Date: Aug. 1, 2005

(87) PCT Pub. No.: WO2004/037588

PCT Pub. Date: May 6, 2004

(65) Prior Publication Data

US 2005/0269832 A1 Dec. 8, 2005

(30) Foreign Application Priority Data

Oct. 18, 2002 (FR) .................................. 02 13002
Oct. 30, 2002 (FR) .................................. 02 13594
Jul. 16, 2003 (FR) .................................. 03 08694

(51) Int. Cl.
   *B60J 7/14* (2006.01)
(52) U.S. Cl. ............ 296/108; 296/107.01; 296/107.08

(58) Field of Classification Search ............ 296/107.01, 296/108, 107.08, 107.11, 107.17
See application file for complete search history.

(56) References Cited

U.S. PATENT DOCUMENTS 5,975,620 A 11/1999 Jambor et al.
6,412,860 B1 7/2002 Reinsch

FOREIGN PATENT DOCUMENTS

| DE | 43 26 291 A1 | 9/1994 |
| DE | 44 35 222 C1 | 11/1995 |
| DE | 195 39 086 C1 | 10/1996 |
| EP | 1 031 448 A2 | 8/2000 |
| FR | 2 816 248 | 5/2002 |
| FR | 2 820 692 A1 | 8/2002 |
| JP | 63242720 | 10/1988 |

*Primary Examiner*—Lori L. Lyjak
(74) *Attorney, Agent, or Firm*—Bachman & LaPointe

(57) ABSTRACT

A convertible roof for a vehicle and associated vehicle, the roof comprising at least one front roof element and a rear roof element which can move between a deployed position, in which the front roof element and the rear roof element cover the passenger compartment, and a storage position, in which the front roof element and the rear roof element are stored in the boot of the vehicle. The roof also comprising two pivot arms which each pivot along an axis. The roof comprising motorization means, first means of locking the pivot arms to the post of the windshield of the vehicle and second means of locking at least one front roof element of the pivot arms. The first and second locking means and the pivoting movement of the arms are controlled by the same motorization means, such as an electric motor.

20 Claims, 12 Drawing Sheets

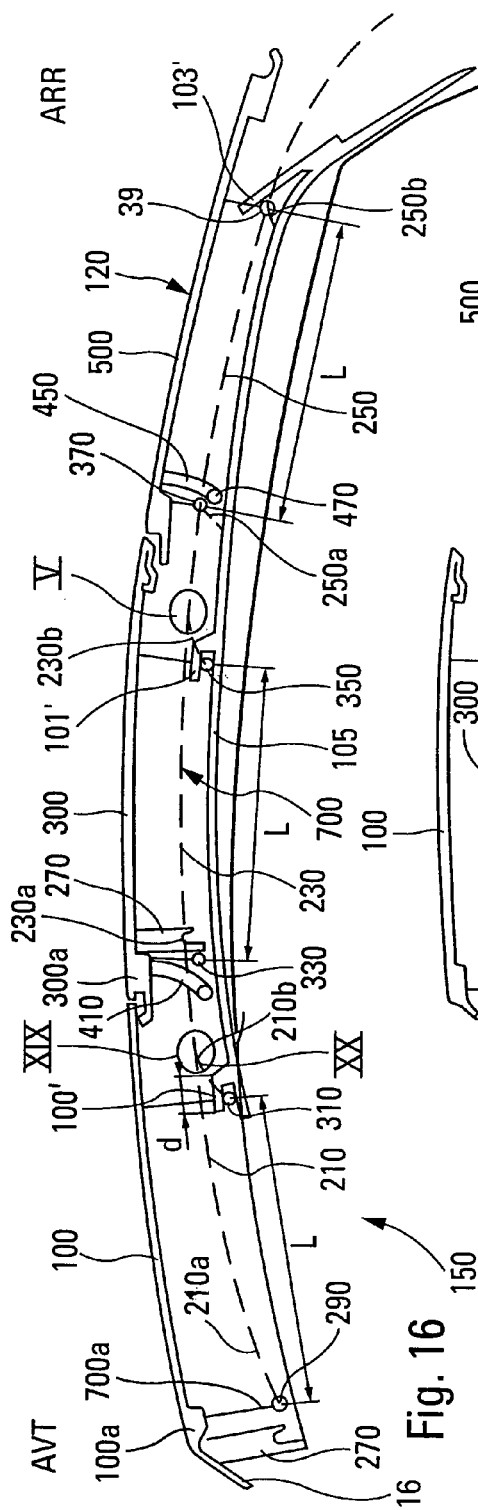
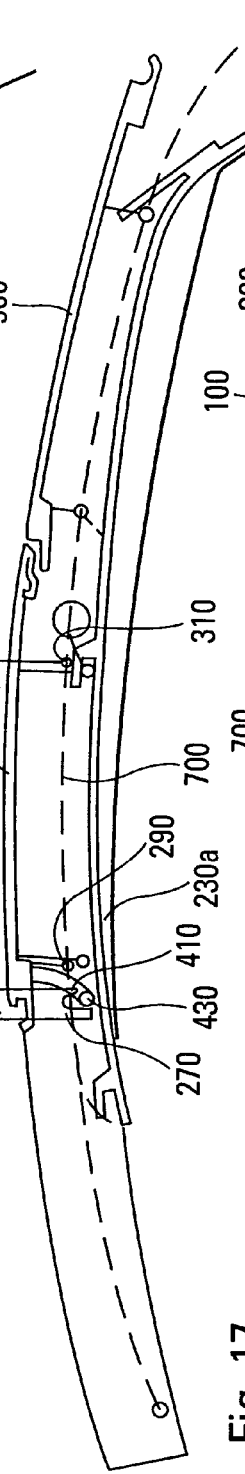
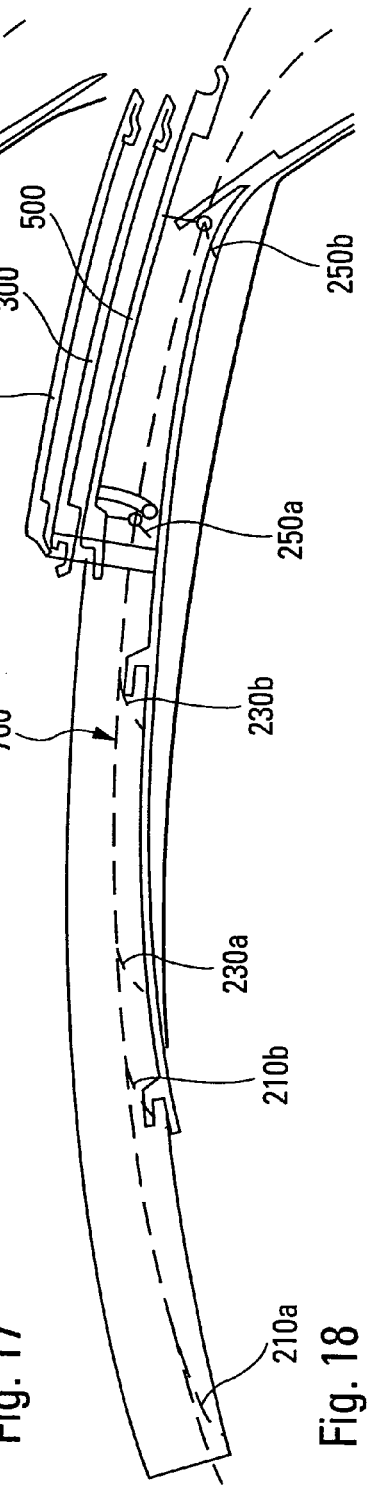
Fig. 16
Fig. 17
Fig. 18

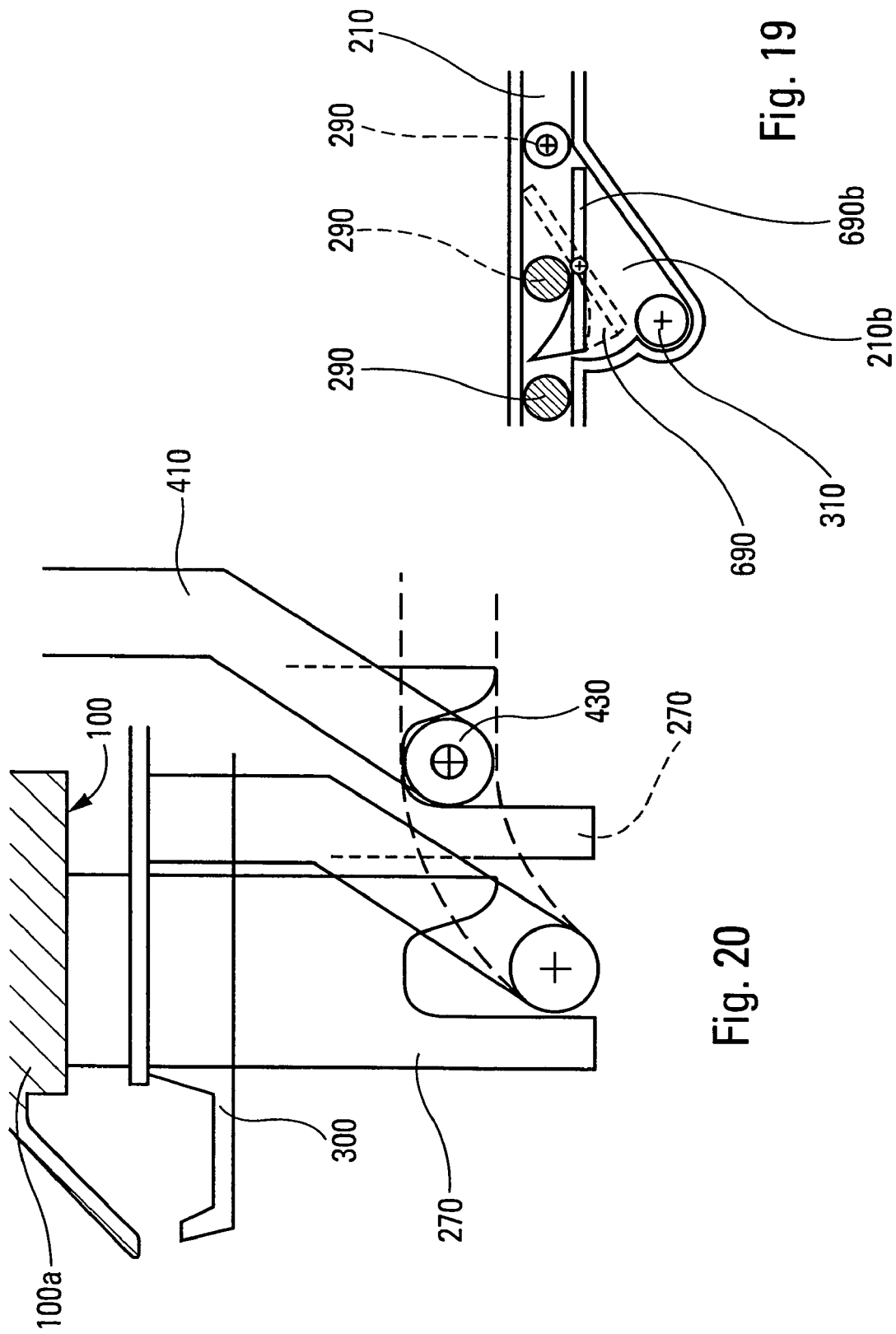

CONVERTIBLE ROOF FOR VEHICLE AND ASSOCIATED VEHICLE

BACKGROUND OF THE INVENTION

This invention relates particularly to a retractable roof for a vehicle, and a vehicle on which such a roof is fitted.

A retractable roof is used particularly to transform a coupe or saloon type vehicle into a convertible type vehicle.

SUMMARY OF THE INVENTION

To achieve this, a characteristic described herein relates to such a roof comprising a roof front element, a roof intermediate element and a roof rear element, these three elements being free to move between a covering position in which they cover the passenger compartment of the vehicle and a storage position in the vehicle boot, in which they are preferably side by side (particularly in a superposed approximately horizontal position).

FR-A-2 816 248 describes a retractable roof comprising several roof elements.

The rear element is displaced towards the boot under the control of a slide extending inside the boot in which a pin is engaged fixed to the rear part of the rear element, and also by a pivoting arm articulated at a fixed point on the vehicle bodywork and articulated to the said rear element.

The front, intermediate and rear elements comprise a very flat central area, sheet metal or a window, and on their sides, two solid areas with a large height compared with the thickness of the central area.

The front, intermediate and rear elements are connected to each other by articulated levers.

When the roof is retracted into the boot, the different elements are superposed one above the other and the assembly is moved into the boot by oscillation and sliding of the rear element towards the boot.

Document DE 44 35 222 also describes a retractable roof comprising at least three front, intermediate and roof rear elements, and two pivoting arms placed in a covering position on each side along the front element.

In the covering position, the two arms extend from the front of the intermediate element to the back of the windscreen.

The pivot axes are located on the front of the intermediate element. During retraction, the two arms fold back and are colinear with one prolonging the other along the intermediate element.

This type of system has the disadvantage that once the stack of roofs is stored in the boot of the vehicle, it occupies a large volume due to the height of the intermediate and roof front elements in the first case and the intermediate element in the second case. And the height of the stack of roof elements is due to the stack of lateral areas of roof elements.

Thus, according to another characteristic, this invention proposes a retractable roof in which the height of the stack of roof elements is reduced by eliminating the constraint imposed by the height of the lateral areas.

More precisely, in this context it is recommended that if the above mentioned arms (that therefore define longitudinal structural cross pieces between which there is at least the roof front element—or rigid panel—are provided in the extended covering position) are provided, they must be disposed free to pivot on the roof rear element between the covering position in which they extend between the front end of the rear element of the windscreen, on each side of and along the roof front element, and the storage position in which they overlap transversally with respect to the plane of symmetry of the vehicle.

In a particular embodiment of the invention, the roof further comprises a roof intermediate element, the arms then extending in the covering position on each side and along the roof front and intermediate elements.

Also in a preferred embodiment which saves space along the longitudinal (X axis) and with a relatively simple mechanism, the arms pivot about non-parallel rotation axes.

Thus, only the central areas of the front and roof intermediate elements are superposed with the rear element, which significantly reduces the stack height. The arms are then folded back at the front of the rear element. A large space saving is then achieved so that the result is a boot with a larger and more easily accessible useful volume. Furthermore, the invention provides more opportunities for positioning the rear element in the boot and therefore for choosing the corresponding lengths of the different elements.

In one particular embodiment, the displacement of the rear element may be controlled firstly by a slide extending inside the boot in which a pin is engaged fixed to the rear part of the rear element, and secondly by a pivot arm articulated at a fixed point of the vehicle bodywork and articulated to the said rear element.

The front element may be connected to the intermediate element by at least two levers articulated to the said front element and to the said intermediate element and the intermediate element may be connected to the rear element by at least two levers articulated to the said intermediate element and to the said rear element.

According to another embodiment, two series of superposed lateral slides for front and roof intermediate elements may extend along the arms and along the two inner lateral parts of the rear element in the covering position. Each slide may include two slide sections, a first slide section being placed on one of the arms, the second slide section being placed on the inner lateral part of the rear element corresponding to the said arm.

The front and roof intermediate elements may each comprise at least two pins supported on their sides engaged, and each free to slide in a lateral slide so as to guide the sliding movement of the front and roof intermediate elements one under the other and under the rear element.

Another purpose of the invention is an automobile vehicle including a retractable roof as described above.

Another innovative aspect that can be dissociated from the aspect described above, is also described in FR-A-2 820 692, related to means of locking roof elements to each other and to the upright of the vehicle windscreen.

In particular, these locking means are suitable for use with a retractable roof including roof elements extending over the entire width of the roof.

In the case of a retractable roof including pivoting arms, it is essential that roof elements and pivoting arms in the covering position should be fixed with respect to each other and with respect to the windscreen upright.

Therefore, the objective herein is to provide efficient locking means for a retractable roof including pivoting arms to reduce the height of the stack of roof elements by eliminating the constraint imposed by the height of the lateral areas.

Consequently, more precisely it is proposed that a retractable roof of the type presented above with pivoting arms, should comprise motor drive means, first means of locking the pivoting arms on the upright of the vehicle windscreen and second means of locking at least the roof front element on the pivoting arms, the first and second locking means and pivoting of the arms being controlled by the same motor drive means such as an electric motor.

In one particular embodiment, the first and second locking means are controlled by drive rods extending inside the arms driven in rotation by the motor drive means.

The first means of locking each arm on the windscreen upright may include a pivoting locking hook cooperating with a complementary locking device fixed to the windscreen upright, pivoting of each pivoting locking hook possibly being controlled by a nut installed on a threaded part of one of the rods driven in rotation by the motor drive means.

The second locking means may advantageously include a projection fixed on screwing means connected to a drive rod, the said projection being free to move in translation on the screwing means and designed to be positioned inside a corresponding cavity in one of the arms when the roof is locked.

Means for retracting roof elements may include a threaded pivot rod along an axis coincident with the axis of one of the pivot arms placed in connection with the drive rod such that rotation of the locking rod causes rotation of the pivot rod.

In an embodiment, arms can pivot about non-parallel rotation axes.

Thus, only central areas of the front and roof intermediate elements are superposed with the rear element, which considerably reduces the height of the stack. The arms are folded at the front of the rear element. A large space saving is then achieved so that the result is a boot with a larger and more easily accessible useful volume. Furthermore, it is possible to position the rear element in the boot and therefore to choose the corresponding lengths of different elements.

In one particular embodiment, displacement of the rear element may be controlled firstly by a slide extending inside the boot in which a pin is engaged fixed to the rear part of the rear element, and secondly by a pivoting arm articulated to a fixed point on the vehicle bodywork and articulated to the said rear element.

The front element may be connected to the intermediate element by at least two levers articulated to the said front element and to the said intermediate element and the intermediate element may be connected to the rear element by at least two levers articulated to the said intermediate element and to the said rear element.

According to another embodiment, two series of lateral slides superposed for the roof front and intermediate elements may extend along the arms and along the two inner lateral parts of the rear element in the covering position.

Each slide may include two slide sections, a first slide section being placed on one of the arms, the second slide section being placed on the inner lateral part of the rear element corresponding to the said arm.

The roof front and intermediate elements may each comprise at least two pins provided on their side edges each engaged free to slide in a lateral slide so as to guide the sliding movement of the roof front and intermediate elements one under the other and under the rear element.

This invention also relates to an automobile vehicle on which such a roof is installed.

This invention also relates to a retractable roof system for a fixed or mobile structure, particularly for an automobile vehicle, in combination with or independently from the above.

Patent FR-A-2 798 327 describes a retractable roof system for a vehicle composed of at least two rigid roof panels, namely a first roof front element and a second central roof element (or roof intermediate element) fixed to each other by sliding means arranged such that the front panel is free to move between a closed position in which it covers the passenger compartment and an open position in which, after sliding backwards, it is superposed over the central panel. This system includes two parallel bowed slides fixed to the bodywork (or structure) of the vehicle and each extending preferably between a point close to the front of the central panel and a point close to the bottom of the boot of the vehicle and therefore the end of the vehicle, the central panel comprising devices that cooperate with slides to guide its displacement along the slides.

A problem that the invention intends to solve within this context is to overcome dimensional and maneuverability disadvantages of the above mentioned system in order to increase the storage space remaining in the boot once the roof has been put away, if necessary in relation with a tipping rear window if there is one (particularly an oscillating-sliding window) that may or may not form part of the said above mentioned mobile parts of the roof.

Therefore, the invention proposes a vehicle comprising:
seats near the back of the passenger compartment, and a storage space arranged behind these seats,
a vehicle structure locally defining a roof zone that has a closable opening and a retractable roof, this roof comprising at least two rigid parts (or elements) free to move with respect to said structure, namely a first front part and a second rear part,
first displacement elements to which the said roof parts are connected during at least part of their movement between an extended position reached by a forward displacement and in which these parts cover the passenger compartment, approximately in line one behind the other, and a folded position reached by displacement towards the back of the vehicle and in which the said parts are offset from each other and retracted behind the seats, at least some of these roof parts then being arranged in a first storage position,
and additional displacement elements engaged by at least the said roof parts arranged in their said first storage position to move these roof parts to a second storage position different from the first, if necessary.

These additional displacement elements may in particular displace parts of the roof from a first storage position (that may approximately be vertical) to a second storage position (that may be approximately horizontal).

Advantageously, the additional displacement elements will be installed free to move with respect to the vehicle structure and with respect to the first displacement means, the roof parts arranged in the first storage position being separated from the first displacement means while engaging the additional displacement means so that they can be displaced from their first position to their second storage position.

This type of roof system can improve the storage space available at the back of the car in the boot.

According to one preferred complementary characteristic, the first displacement elements will include two parallel bowed slide assemblies connected to the vehicle structure, each assembly extending between an area located forward from the said second rear part, one on each side of the reception opening of the roof parts, and an area located in the said roof storage space in the folded position behind the seats, the said roof parts being connected to the slide assemblies during at least part of their movement, through sliding connection means arranged such that the said first and second roof parts are free to move between their said extended and folded positions.

Preferably, each slide assembly and the additional displacement elements connected to it will also advantageously define a first slide front part extending between a point in front of the said rear part of the roof and a point close to the upper edge behind the said seats, and a second slide part extending between approximately the said upper edge behind the said seats and a point close to the bottom of the boot of the vehicle just behind these seats, in the lower part of the roof storage space, each second slide part being installed free to move with respect to the vehicle structure and the first part of the corresponding slide and being connected to the said roof parts concerned when they reach their second folded position, and that these parts are then engaged with the second slide parts and released from the first slide parts, so that these roof parts move into their said superposed and approximately horizontal position.

This type of retractable system enables precise guidance of roof parts between their closed position above the passenger compartment and their open position (stored in the boot) in which the roof parts can be stored in an approximately vertical position or an approximately horizontal position.

According to another characteristic:
in the deployed position of the roof parts, they are located one behind the other between the windscreen at the front fixed to the structure of the vehicle, and a rear element (that can be retractable) comprising the rear window,
and in a horizontally stored position, the front and central panels are preferably arranged either in the upper part of the said roof storage area, or in the lower part in an area in the bottom of the storage space.

According to another aspect related to a storage process, the following steps are also recommended so that the opening roof can be stored behind the seats:
a) starting from a closed state of the roof in which the two parts of the roof cover the passenger compartment, approximately in line with each other and one behind the other, at least some of these roof parts should be displaced as far as the inside of the storage space as far as a first storage position,
b) the roof part(s) concerned should then be moved once again towards a second position different from the first and preferably located either in the upper part or in the lower part of the roof rear storage area.

According to yet another innovative aspect to be considered in combination with or separately from the above, the invention relates to an opening roof system for an automobile vehicle provided with a structure (or a chassis), the opening roof system comprising at least one roof front panel (or element) and one roof rear panel (or element), the said roof panels being free to move with respect to each other along a longitudinal direction (typically the longitudinal direction along which the vehicle moves forwards) between:
a flush position in which the panels are arranged approximately at the same level as each other, the roof front panel then being located in front of the roof rear panel, along the said longitudinal direction,
and a position offset in height in which the roof panels are arranged at least partially one above the other.

Starting from such a known system, one purpose is to purpose a reliable opening roof system with relatively simple mechanical control, with a cost price compatible with series production in liaison with automobile manufacturers, which avoids problems encountered in the past with coordination of panel movements to achieve reliable and high performance kinematics.

This is why it is here proposed that in the system described above:
either the roof front or the rear panel should comprise a group of front levers and a group of rear levers installed articulated with respect to this roof panel, to tip between:
a low position in which the panel concerned is approximately flush with a surrounding part of the vehicle structure,
and a high position in which the said panel concerned is offset in height from its flush position,
at least one of the said roof panels, one including the groups of levers and the other panel, including drive means if necessary to entrain the groups of levers and one of the panels:
either backwards over a distance such that the roof panel concerned moves from its flush position to its height offset position,
or forwards over the said distance but in the reverse direction, to move this same roof panel from its offset. position to its flush position, and
the groups of levers preferably engage guides (typically grooves or slides) extending essentially approximately parallel to the said longitudinal direction, under the control of the said drive means, these guides being adapted:
during the controlled backwards displacement of the groups of levers, to guide their changeover from the flush position of the corresponding panel to its offset position,
and during the controlled forwards displacement of these same groups of levers, to guide their changeover from the offset position of the corresponding panel to its flush position.

To make it even easier to achieve the purposes mentioned above with a relatively simple, high performance and reliable mechanical control, another characteristic recommends that the groups of lever(s) should individually include a cranked lever including a first branch articulated in rotation on the corresponding roof panel and connected and fixed by an elbow to a second branch which engages one of the said guides for its guided drive.

With the same purpose and based on information derived from previously known use of "slide" type means, according to another characteristic, the lever guides fitted on the roof panel(s) concerned advantageously comprise slides in which these groups of lever(s) slide, the slides locally including deviations extending obliquely from the horizontal and from the said longitudinal direction, over a sufficient length so that each can individually hold part of the said groups of levers, such that once engaged in these deviations, the groups of levers concerned pivot from one of their high or low positions to the other low or high positions.

Another problem to which this invention relates is the way of displacing each roof element and panel concerned between these high and low positions, taking account of the position of adjacent roof panels and the adjacent vehicle structure (with which it would typically be required that the roof panels are approximately flush with the surrounding bodywork structure, particularly at windscreen, when the roof panels are in the closed position).

To achieve this, and possibly in combination with the above, another innovative characteristic specifies that advantageously said (or each) slide (or groove) in which the roof panel (or element) concerned slides, has at least one front inclination facing downwards over its length along the longitudinal direction of the vehicle, and a second back inclination also facing downwards, these front and back inclinations being separated longitudinally by a distance corresponding to the longitudinal spacing between the (said groups of) front and back levers of the roof panel concerned, such that the (groups of) levers can be engaged either in the low position of this roof panel (typically the position slid forwards towards the windscreen) or disengaged when this panel is sliding backwards, access by one of the back levers to the second corresponding rear inclination depending on the position of a tipping lever (or rocker) located in the slide and which:

in a first position, prevents access of the second rear inclination and therefore imposes sliding of the roof panel in the high position, and in a second inclined position, through the slide, enables the rear lever of the roof element to penetrate into or to come out of the second rear inclination.

For reliability, efficiency and cost limitation reasons, it is also recommended that each tipping lever should occupy a front lever portion located forwards from its pivot. axis and a rear lever portion located backwards from its pivot axis, which is transverse to the elongation direction of the slide, each tipping lever extending in its second position parallel to the direction of the slide, along a lower area of the slide, thus directly closing off access to the second rear inclination through its rear portion.

When each of the above mentioned front and rear levers (or groups of levers) is engaged in the corresponding slide through a front slide and a rear slide belonging to their second branch, the length of this second branch (distance between two slider blocks) will preferably be equal to the length of the deviation of the slide in which it is engaged, this length also being adapted to the movement of the "rockers".

Furthermore, the front portion of each rocker preferably extends and rocks under the slide, in front of the second rear inclination, this front portion then having a front edge cranked upwards, that during tipping, passes through an opening formed in the slide to cooperate with the front elbow of the roof panel concerned.

Note also that the rear portion of each rocker has a lower surface advantageously defining part of the contour of the second rear inclination, in the inclined position of this tipping lever.

According to yet another innovative aspect of this invention, it relates to a process for manoeuvring rigid roof opening panels so as to enable a smooth and precise movement under safe, reliable and efficient conditions, based on a simple, high performance mechanism that can be produced in production series for the automobile industry.

In this context, the proposed process specifies that:

opening of one of the roof panels by sliding backwards in the slides causes the said front and rear levers (or groups of levers) to escape from the corresponding deviations while the rocker is in its second inclined position, at the same time as the said panel is tipped upwards, linked to the selected articulation of the (groups of) levers, continued sliding of the said roof panel backwards causes the rocker to change to its first position under the effect of a thrust applied to it by a front lever (or groups of levers), and that when sliding occurs in the opposite direction towards the front of the same roof panel, the rocker changes back to its second inclined position under the effect of a thrust applied by the front lever concerned, on its front edge cranked upwards, this "return" tipping causes retraction (preferably outside the slide) of the cranked front edge of the said rocker and opens up access to the second rear inclination, thus enabling the rear lever concerned (in the group of levers) to be engaged in it when the front lever concerned (in the group of levers) reaches the first front inclination of the slide.

BRIEF DESCRIPTION OF THE DRAWINGS

Other specific features and advantages of the invention will become clearer in the following description and in the appended figures given as non-limitative examples, wherein:

FIGS. 16, 17 and 18 illustrate superposition of roof elements in the previous figure according to one embodiment, and a locking system;

FIG. 19 is an enlarged view of the guide means according to FIGS. 16 to 18;

FIG. 20 is an enlarged view of the drive means according to FIGS. 16 to 18;

DETAILED DESCRIPTION OF THE PREFERRED EMBODIMENT(S)

In the following description for any part of the vehicle, the rear means the rear part of the vehicle, namely the boot in which the folding or retractable roof 1 is stored, and the front is defined accordingly.

Since the vehicle described is symmetrical, the left side and the right side of any part of the vehicle will be defined indifferently as being the lateral side.

Figure 1:
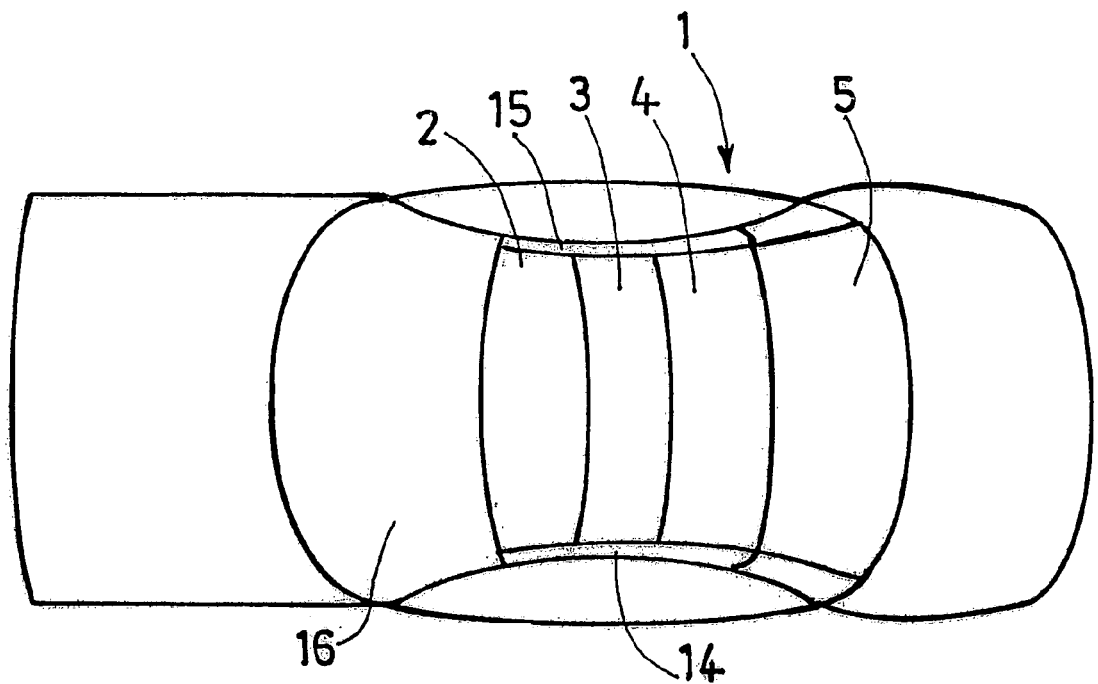
FIG. 1 is a top view of a vehicle including an innovating retractable roof.

FIG. 1 shows a vehicle comprising a retractable roof 1 comprising four rigid roof elements; a roof front element 2, two roof intermediate elements 3, 4 and a roof rear element 5 that can be displaced between a covering position in which they cover the vehicle passenger compartment and a storage position in which they are stored inside the boot of the vehicle.

According to other embodiments not shown, the roof may comprise zero, only one or even more than two intermediate elements.

Figure 2:
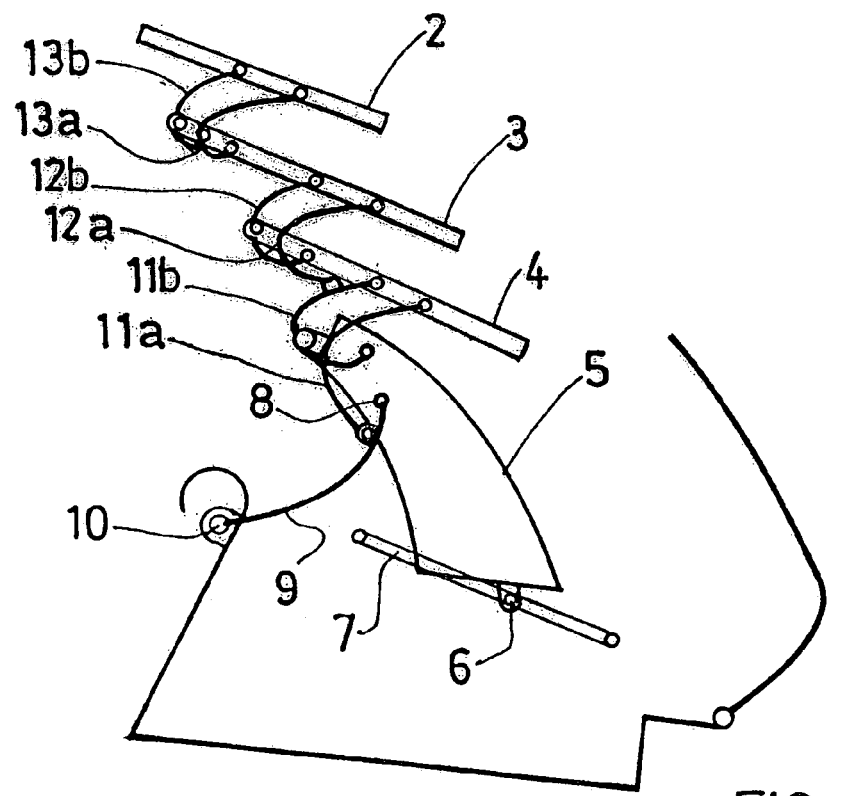
FIG. 2 shows a side view of the front, rear and roof intermediate elements during retraction.
Figure 3:
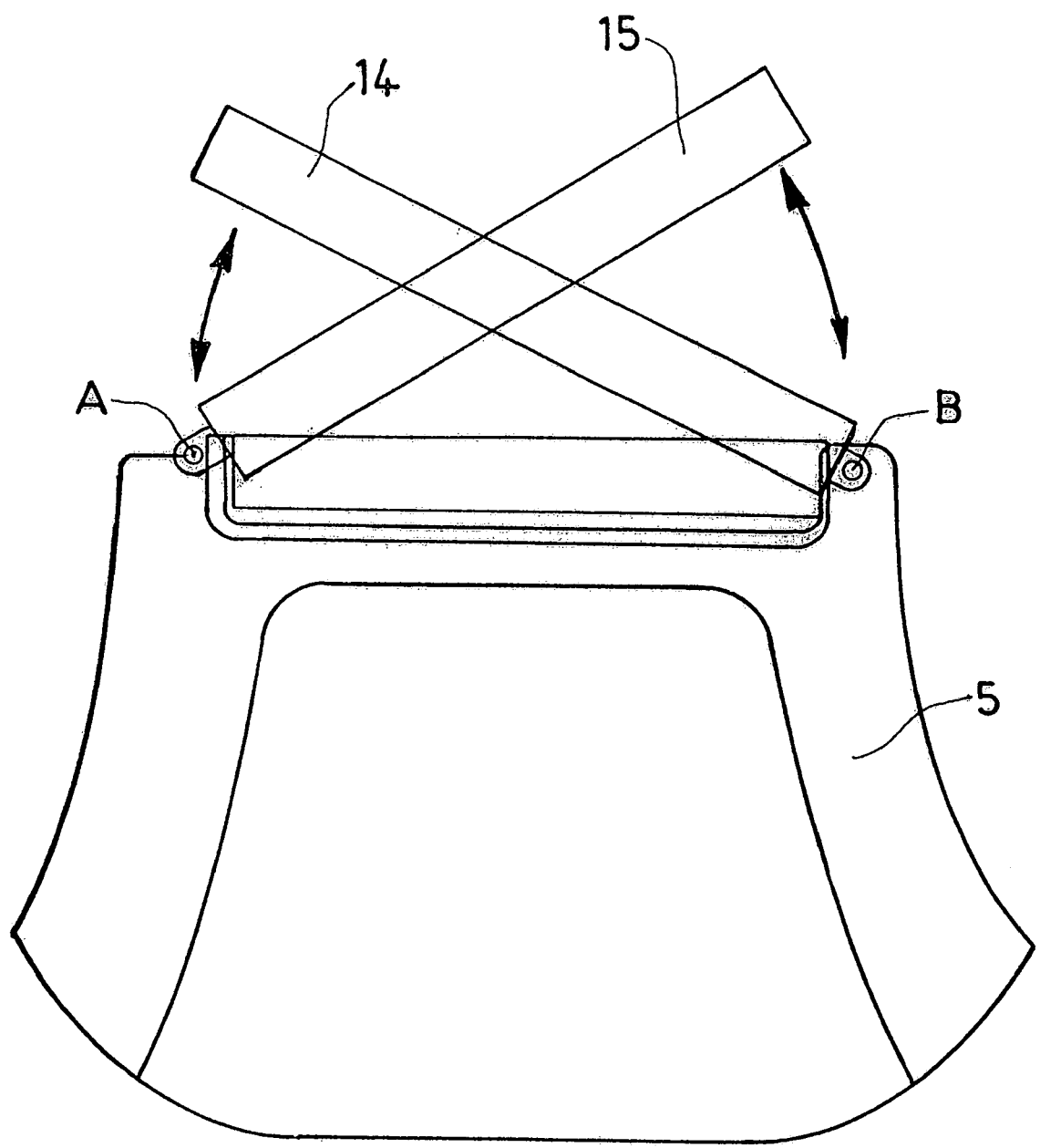
FIG. 3 is a top view illustrating pivoting of arms with respect to the roof rear element.

As can be seen in FIG. 2, the rear of the rear element 5 comprises a pin 6 inserted in a slide 7 extending inside the vehicle boot.

One end of a pivoting lever arm 9 is articulated at a point 8 of the rear element.

The other end of the lever arm 9 is articulated to the vehicle bodywork at a fixed point 10. The lever arm 9 and the slide 7 displace the rear element 5.

The rear element 5 is also connected to the intermediate element 4 through two pairs of levers. Two levers 11a, 11b are articulated firstly to the front of the rear element 5 and secondly to the rear of the intermediate element 4, on each lateral side.

The intermediate element 4 is also connected to the intermediate element 3 by means of two pairs of levers. Two levers 12a, 12b on each lateral side are articulated firstly to the front of the intermediate element 4 and secondly to the rear of the intermediate element 3.

Finally, the intermediate element 3 is connected to the front element 2 by means of two pairs of levers. Two levers 13a, 13b on each lateral side are articulated firstly to the front of the intermediate element 3 and secondly to the back of the front element 2.

The displacement of the rear element 5 towards the boot causes displacement of the intermediate element 4 on the rear element 5 in a known manner, displacement of the intermediate element 3 and the front element 2 on the intermediate element 4 and the intermediate element 3 respectively.

Figure 4:
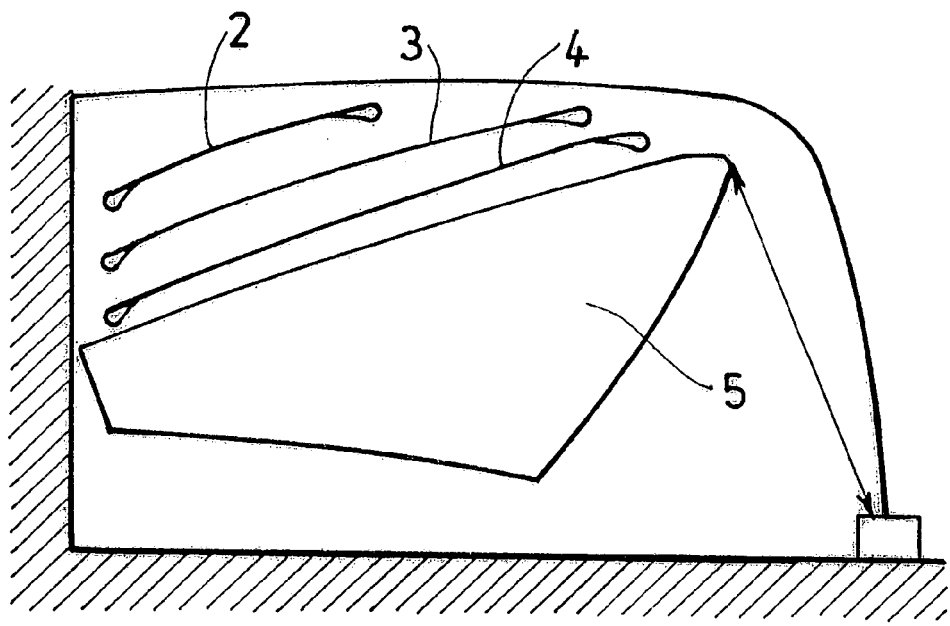
FIG. 4 shows a diagrammatic longitudinal section of roof elements in FIG. 1 in the storage position in the boot.

Thus, in the storage position shown in FIG. 4, the front element 2 is above the intermediate element 3, the intermediate element 3 is above the intermediate element 4, which is itself above the rear element 5.

With reference to FIG. 1, in the covering position two pivoting arms 14, 15 extend along the lateral sides of the roof elements 2, 3 and 4 between the front of the rear element 5 and the rear of the vehicle windscreen 16.

The arms 14, 15 are mounted each free to pivot about an axis of rotation A, B located on the front of the rear element 5. The axes of rotation A and B are not parallel.

Figure 5:
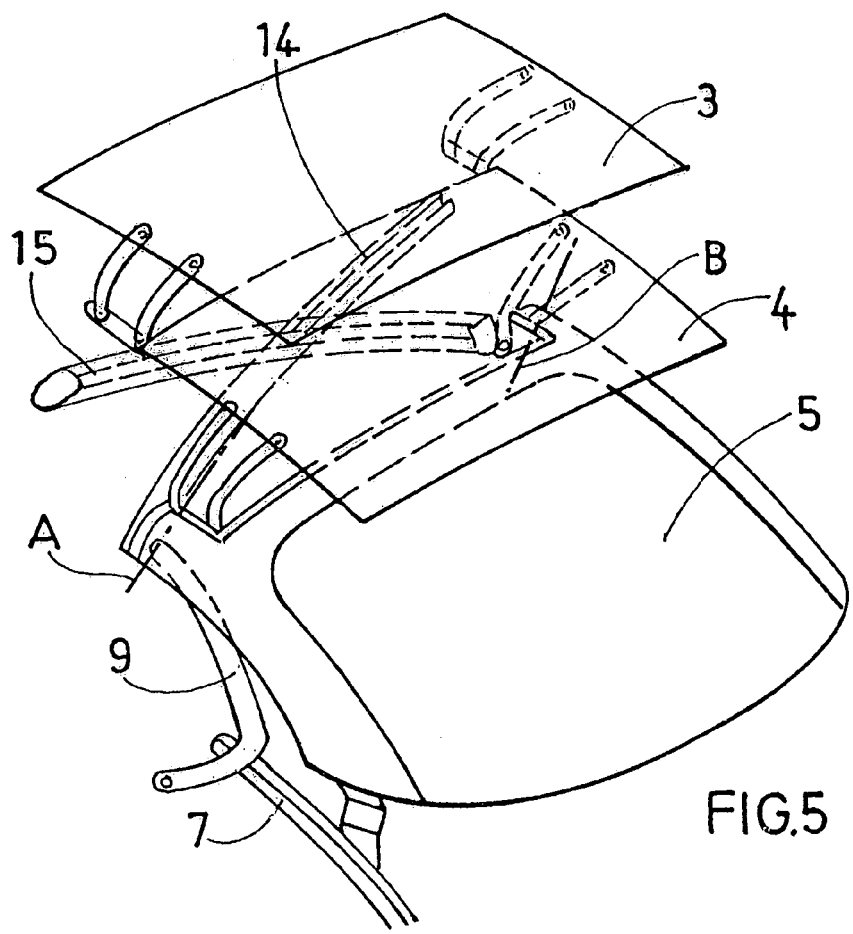
FIG. 5 shows a perspective view of all roof elements during retraction.

When the roof is retracted as shown in FIG. 5, the two arms 14, 15 pivot about their axis of rotation A, B from a longitudinal position (roof covering position) to a transverse position (roof storage position).

Since the axes of rotation A and B are not parallel, the arms 14, 15 move in two distinct planes such that the arms 14, 15 can overlap.

Depending on the orientation and placement of the axes A, B on the rear element 5, the arms 14, 15 are superposed one above the other, or are placed one in front of the other.

Figure 6:
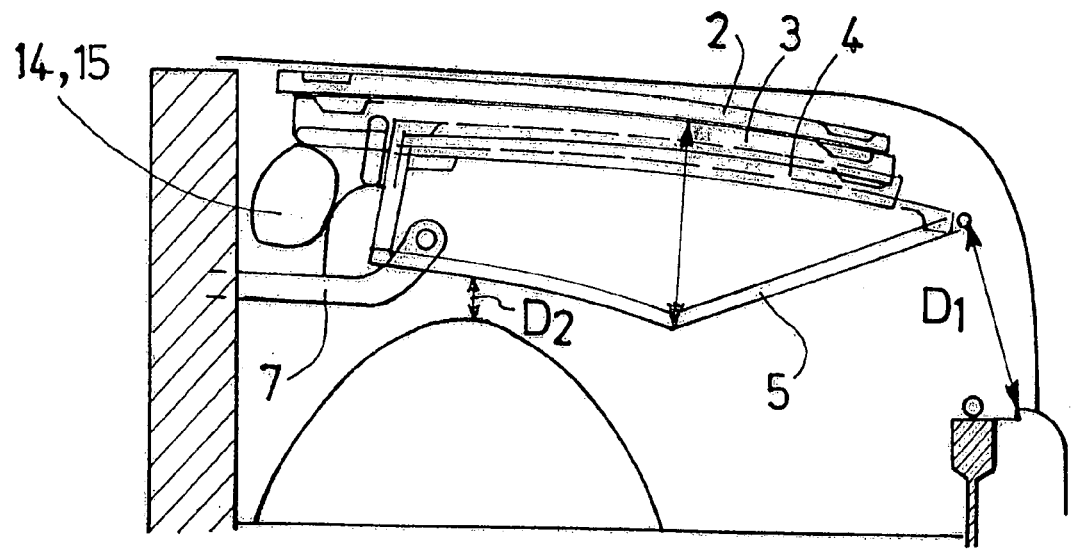
FIG. 6 shows a view corresponding to the view in FIG. 4 and also comprising the two arms.

In the storage position shown in FIG. 6, the arms 14, 15 overlap along the front of the roof front element 2, the roof intermediate elements 3, 4 and the rear element 5. The arms 14, 15 are located in the front part of the boot opposite the opening area of the said boot.

Thus, in this position, the height above the rear element 5 corresponds to the height at which intermediate elements 3 and 4 and the front element 2 are superposed.

The global height of roof elements 2, 5 is less than the global height of retractable roofs without pivot arms 14, 15.

Therefore, the distance D1 between the back of the rear element 5 and the bottom of the boot opening area is greater.

Similarly, since the assembly formed by roof elements does not extend as far towards the bottom of the boot, the saved volume releases a greater useful volume of the boot.

The rear wheel arch occupies part of the volume of the boot, on each side of the boot. For vehicles with retractable roof, the volume occupied by the wheel arch is an important constraint. In this case the roof eliminates this problem and even releases a height D2 between the top of the wheel arch and the assembly formed by the roof elements in the boot.

Furthermore, the presence of independent arms 14, 15 on the roof front element 2 and the roof intermediate elements 3, 4 makes it possible to displace the roof front element 2 only, or the front element 2 and the roof intermediate element 3, or the roof front element 2 and the roof intermediate elements 3 and 4 so as to provide the vehicle with an opening roof.

Figure 8:
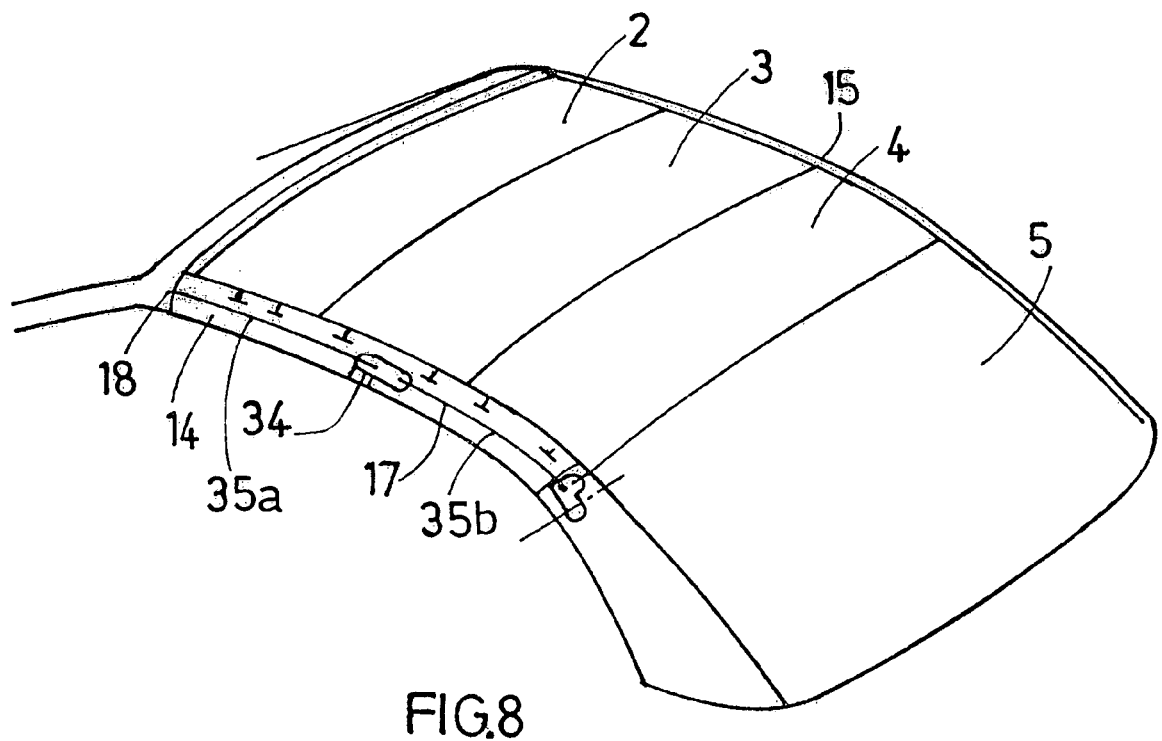
FIG. 8 is a perspective view of the roof illustrating locking means.

With reference to FIG. 8, in the covering position, the roof front element 2 and the roof intermediate elements 3 and 4 are locked on each side to the arms 14 and 15 by locking means that may be composed of the first and second locking means shown.

In this case, each arm 14, 15 comprises a motor 34 comprising two output shafts and is located approximately in the middle of the arm. Two parts of drive rods 35a, 35b extend on each side of the motor 34 as far as the arm ends 14, 15. Rod parts 35a, 35b are slaved in rotation by the motor 34.

The rod part 35a extends from the motor 34 as far as the windscreen 16. Rod part 35b extends from the motor 34 as far as the pivot axes A, B of the arm 14, 15.

Figure 9:
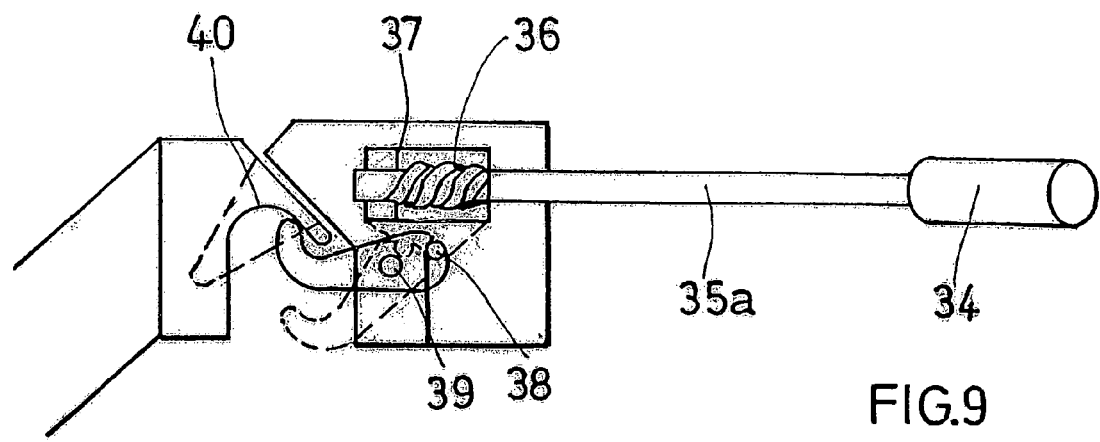
FIG. 9 is a diagrammatic side view of the first means of locking an arm on the vehicle windscreen upright.

With reference to FIG. 9, the rod part 35a comprises a threaded part 36 on which a nut 37 is mounted.

The nut 37 comprises a pin 38 that fits into a groove 39 formed in the bottom of a pivot hook 18. The pivot hook 18 can come into contact with a locking cavity 40 fixed to the upright of the windscreen 16.

The hook 18 is pivoted under the control of translation of the nut 37, itself controlled by rotation of the rod 35a.

With reference to FIG. 8, the second locking means enable locking of roof elements 2-4 on the arms 14, 15.

Figure 10:
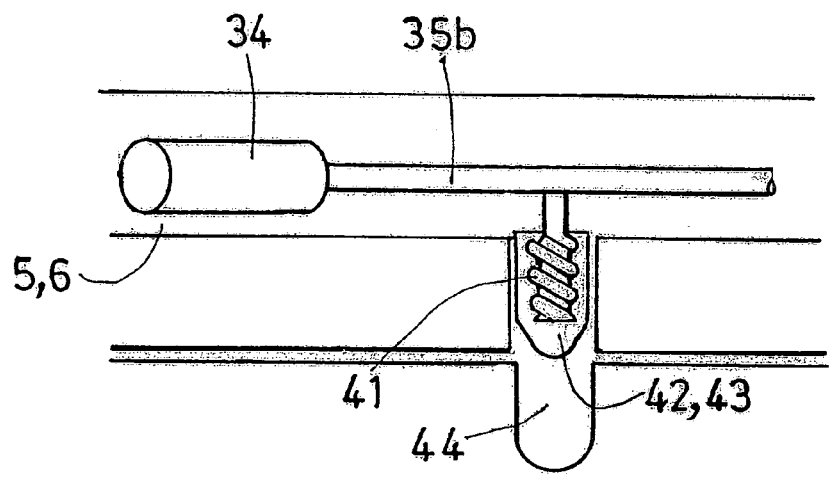
FIG. 10 is a diagrammatic top view of the second means of locking an arm on a roof element.

The second locking means comprise a screwing rod 41 located in the arm 14, 15 on which a nut 42 is mounted carrying a projection 43 (FIG. 10). Rotation of the screwing rod 41 causes translation of the projection 43 into a cavity 44 placed in one of the roof elements 2-4.

The screwing rod 41 in engaged to the drive rod 35a, 35b such that rotation of the drive rod 35a, 35b also rotates the screwing rod 41 and locks/unlocks the roof elements 2-4 with the arm 14, 15.

Figure 11:
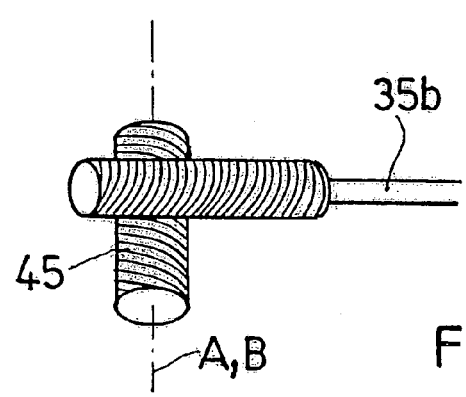
FIG. 11 is a diagrammatic view of the contact between the threaded part of a locking rod and an arm pivot axis.
Figure 7:
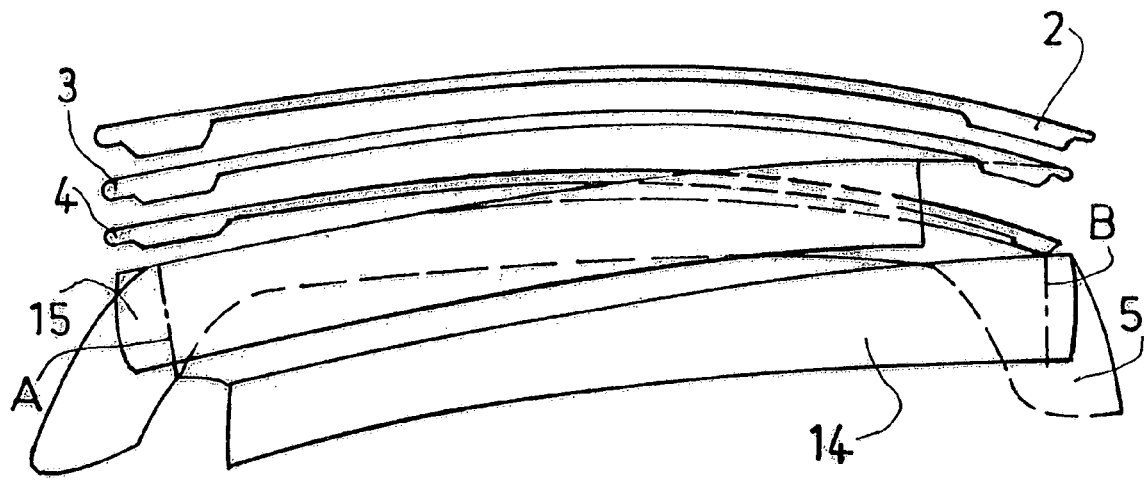
FIG. 7 is a front view corresponding to FIG. 6.

With reference to FIG. 11, the rod 35b is engaged to a pivot rod 45 with a pivot axis A, B of the arms 14, 15. The rod 35b and the rod 45 are perpendicular to each other. The parts of the rod 35b and the rod 45 in contact are threaded such that rotation of one causes rotation of the other.

Consequently, the motor 34 controls rotation of parts of rod 35a, 35b which drive the hook 18, the projection 43 and the pivot pins of the arms 14, 15.

Thus, the roof elements 2-4 are locked onto the arms 14, 15, the roof front element 2 is locked onto the upright of the windscreen 16, and the arms 14, 15 are pivoted under the control of the same motor 34.

This arrangement is also applicable to any other type of retractable roof comprising pivot arms and particularly the retractable roof described in patent DE 44 35 222 in which the arms are mounted on a roof intermediate element.

Arms 14, 15 could also be locked at the back of the windscreen 16 using known locking means controlled by rods 17 and including hook locking pins 18 cooperating with fixed pins fixed to the back of the windscreen 16. This arrangement is described in document FR-A-2 820 692.

Common motor means may also be used to drive the arms and to lock or unlock the roof.

The presence of arms 14, 15 independent of the roof front element 2 and roof intermediate elements 3, 4 makes it possible to displace the roof front element 2 only, or the roof front element 2 and the intermediate element 3, or the roof front element 2 and the roof intermediate elements 3 and 4, so as to provide the vehicle with an opening roof.

Figure 12:
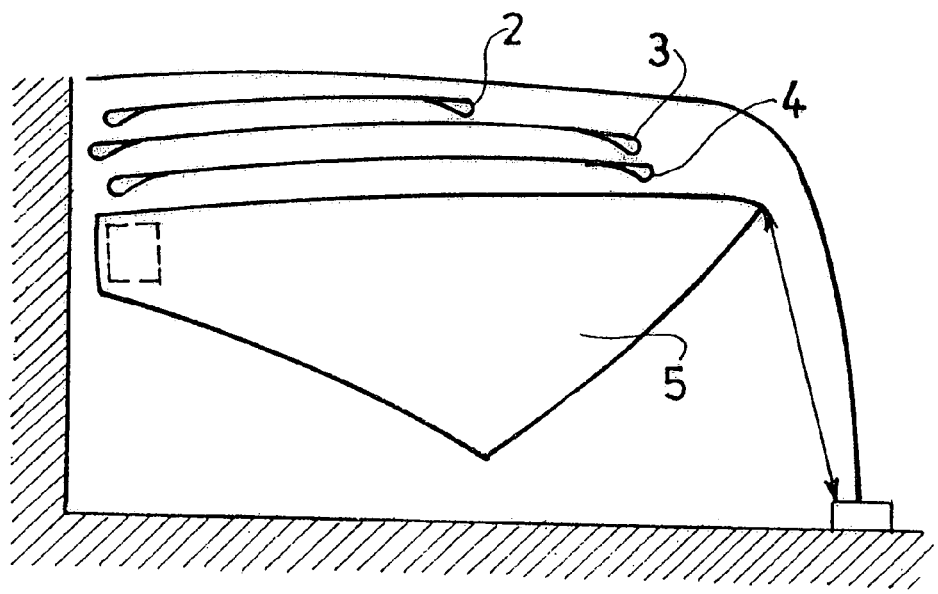
FIG. 12 is similar to FIG. 4 but illustrates another storage arrangement of the roof elements in the boot.

FIG. 12, in comparison with FIG. 4, shows that the inclination of the rear element of the roof can be chosen, for example to increase the boot opening height. The corresponding lengths of the other elements can vary to a certain extent, depending on this inclination.

Figure 13:
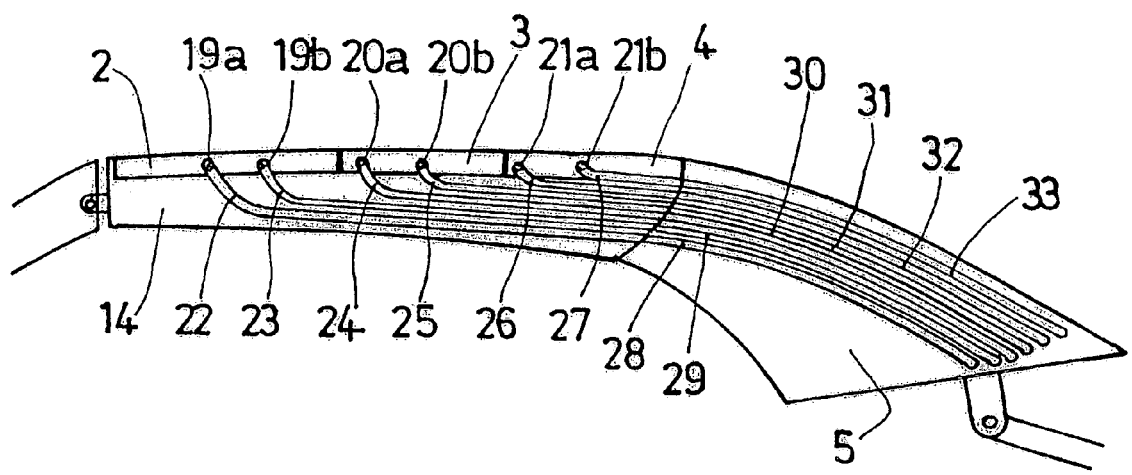
FIG. 13 shows a side view of the roof elements and arms according to a second embodiment.
Figure 14:
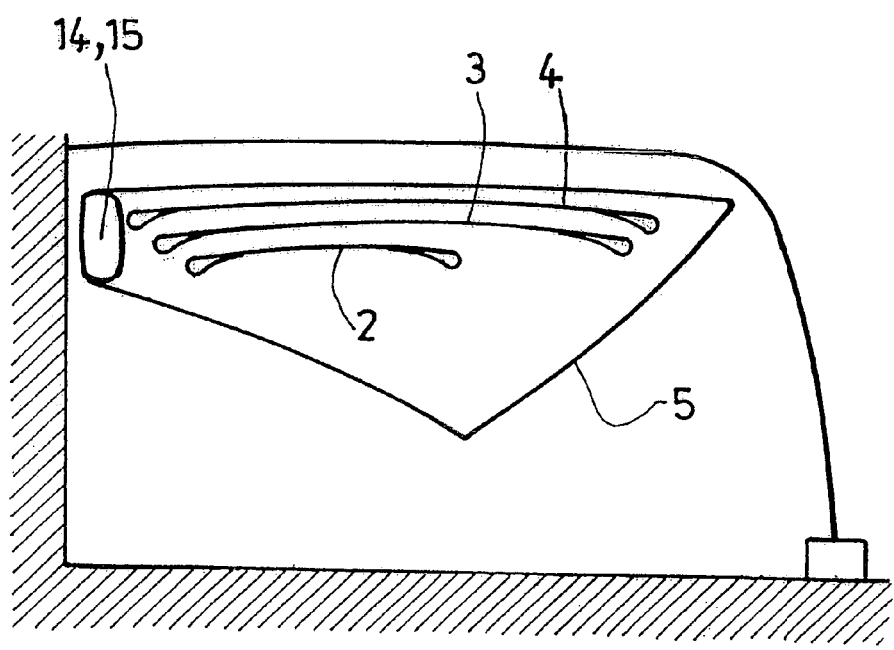
FIG. 14 shows a diagrammatic longitudinal sectional view of roof elements in the storage position in the boot, according to the second embodiment.

With reference to FIGS. 13 and 14, and according to another embodiment of the retraction of roof elements 2 and 5 into the boot of the vehicle, the roof front element 2 and the roof intermediate elements 3 and 4 are provided with two sliding pins 19a, 19b, 20a, 20b, 21a, 21b on each side.

The inside of each arm 14, 15 is provided with six sliding sections 22-27 in the covering position, designed to guide the sliding pins. The six sliding sections extend from the end of the arm 14, 15, including the rotation axis A, B.

Each slide section 22-27 extends as far as a point located on the top of the arm.

Each slide section 22-27 has two parts. The first part of the slide section extends approximately horizontally from the end of the arm 14, 15 including the rotation axis A, B. The second part with a length very much shorter than the length of the first part moves up along a steep inclination from the horizontal, as far as the point on the arm 14, 15.

The slide sections 22-27 are superposed, the longest forming the second part of the section being lowest, and the shortest forming the second part of the section being highest.

In the covering position, the slide sections 22-27 of the arms 14, 15 are prolonged along slide sections 28-33 placed in the inner part of the rear element 5 so as to form six slides in which the pins of the roof front element 2 and the roof rear element 5 are guided.

In one embodiment not shown in which the number of roof elements is different, the number of slides is adapted to the number of roof elements.

When the roof is retracted, the roof front element 2 guided by its pins slides under the intermediate element 3, and the intermediate element 3 slides under the intermediate element 4 that itself slides in the rear element 5. The movements of the rear element 5 and the arms 14, 15 are the same as in the embodiment in which the front element 2 and the intermediate elements 3, 4 are fitted with levers.

As in the previous embodiment, space is saved in the stored position shown in FIG. 8, since the roof front element 2 and the roof intermediate elements 3, 4 take up a minimum amount of space in the roof rear element 5.

The opening roof thus formed has a wide variety of positions and one or several roof elements can be made using a window.

Figure 15:
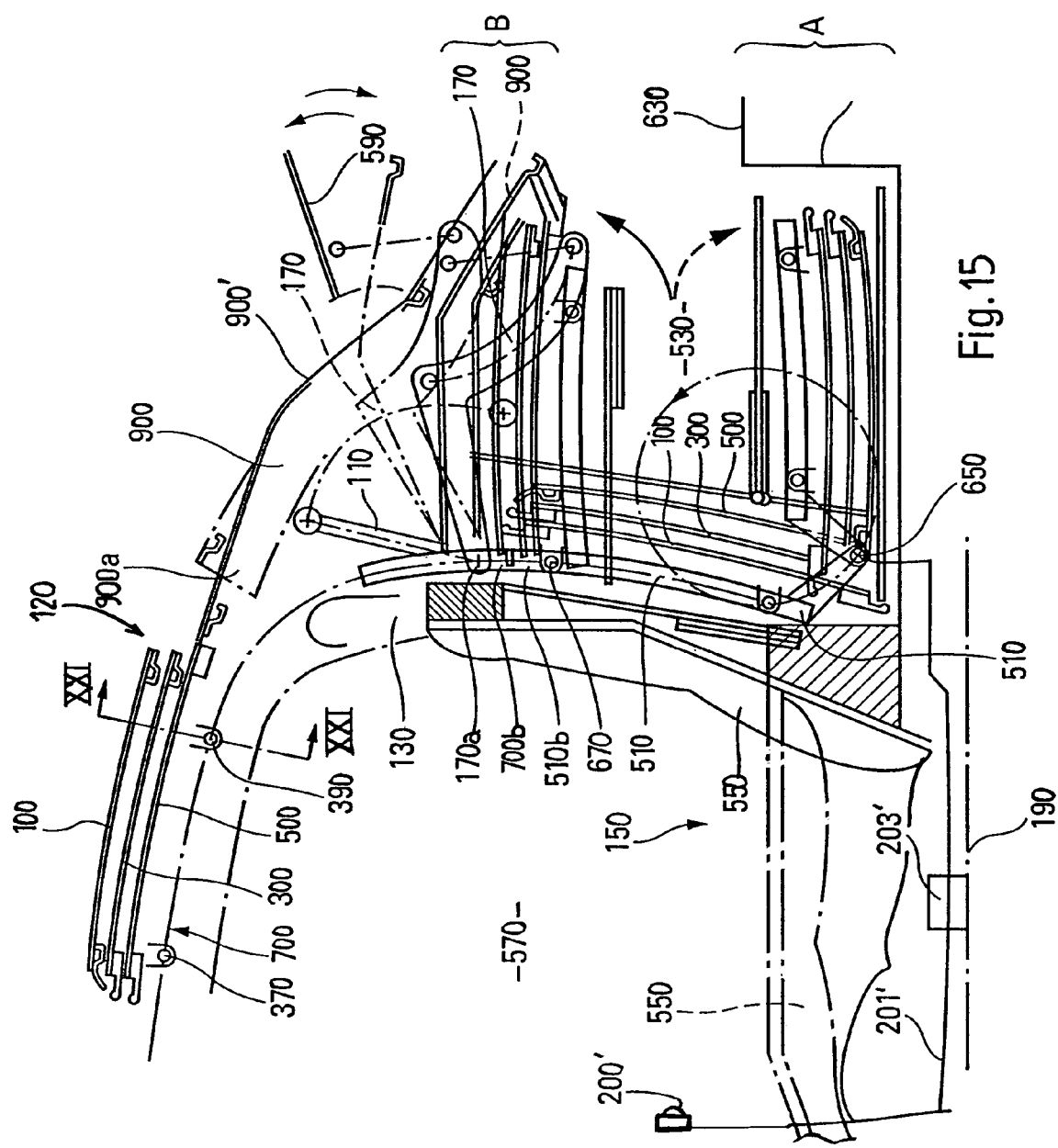
FIG. 15 is a side view of part of a vehicle fitted with a roof in several storage configurations.

Now considering FIG. 15 and subsequent figures, it can be seen in FIGS. 15 to 18 that the retractable opening roof shown comprises three "central" roof elements (or panels) 100, 300, 500 installed free to slide on a slide 700 and an element (or part) of the roof rear (window) 900 installed free to oscillate—slide through an arm 110 connected to the chassis 130 (also called the "structure" of the vehicle 150) and a slide 170 installed free to pivot on the said structure 130, about an axis 170a transverse to the longitudinal direction 190 along which the vehicle advances. The slide 170 thus tips with the boot 590 when it is articulated with respect to the vehicle structure to open (only) from the back towards the front (see mark 170 in dashed lines in FIG. 15).

We will now describe roof elements mounted on the slide 700 as central roof elements (or panels), and the tipping rear window 900 (provided with the window 900') as a roof rear element.

Figure 21:
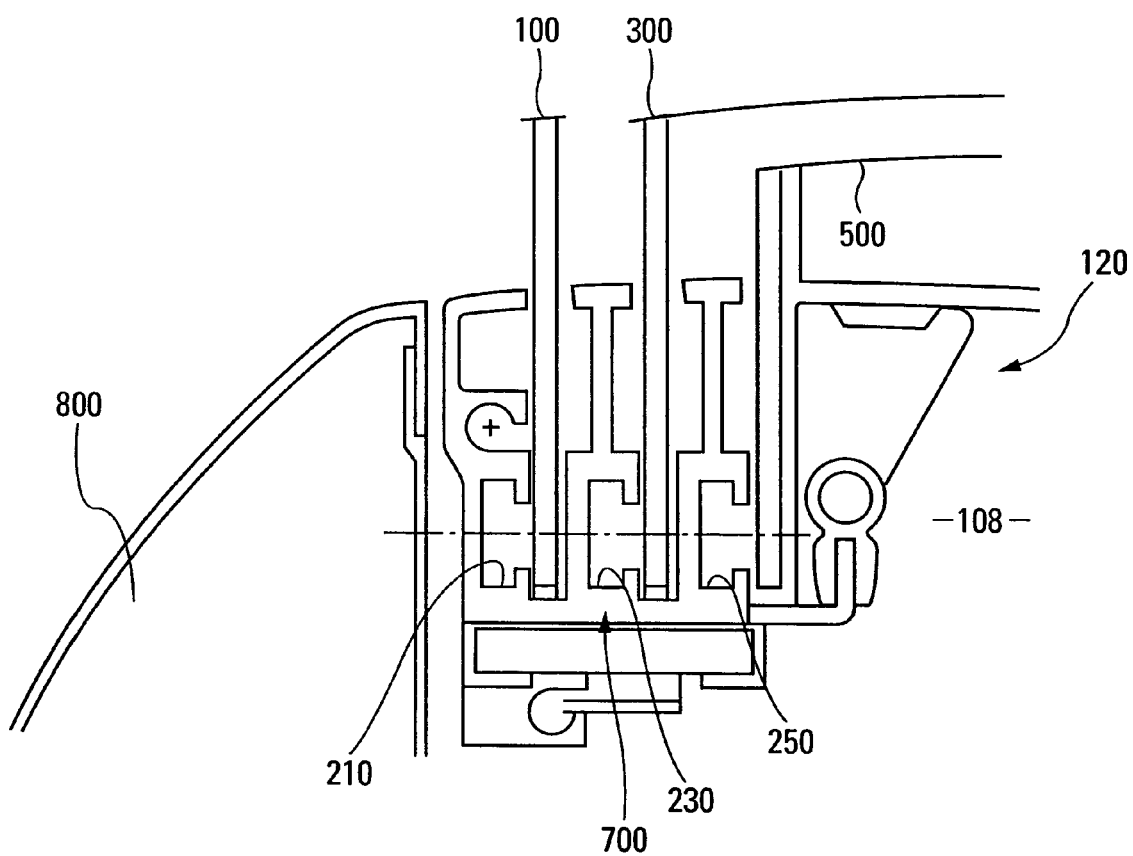
FIG. 21 is a cross section of the slide system on plane XXII-XXII in FIG. 15.

As illustrated in FIGS. 16 and 21, the front central roof 100 is mounted free to slide on a first groove 210 of the slide 700. A second central roof intermediate element 300 is installed free to slide on a second groove 230 of this slide and a third rear central roof element 500 is mounted on a second groove 250 of the same slide. When they open backwards (ARR), the central roof elements are superposed on each other such that the front central roof element 100 is located above the intermediate central roof element 300 that is itself placed on the element 500 (FIG. 15).

The slide 700 is fixed to the structure 130 laterally along fixed roof bars 800 (FIG. 21) extending longitudinally at least along the side edges of the opening 108 formed in the vehicle roof to house the opening roof 120.

The front central roof element 100 is mounted on the first groove 210 of the slide 700. An element forming the hook 270 is located on the front edge 100a of the central roof element (FIG. 20). The front central roof element is pulled backwards by known means that consist of motor driven flexible cables. The front central roof element is engaged in the first groove 210 of the slide by two slider blocks 290, 310 at an axial distance L. The first slider block 290 located furthest forwards from the roof front element is engaged in a deviation 210a (corresponding to an accentuation of the inclination of the groove 210) oriented towards the front of the vehicle and downwards. This deviation is located at the front end of the first groove 210 of the slide. The second slide 310 is located furthest backwards from the roof front element is also engaged in a second rear deviation 210b with the same orientation as the first and distant from it by the same length L mentioned above. When the front central roof is entrained backwards, it is offset upwards by means of the orientation of the first deviation (front) 210a, and the orientation of the rear deviation 210b. The curvature of the groove then enables the roof front element 100 to pass above the roof element 300.

When the roof element 100 slides backwards, the slider block 290 moves in the groove 210 and at the deviation 210b, this slider block moves on a tipping lever 690 then in a position inclined downwards (dashed lines FIG. 19) until this lever is tipped upwards such that is rear part 690b closes off the upper end of the deviation 210a, after the slider block 310 has already moved out of this deviation. It will be understood that this selective guide system with a pivoting lever is repeated at the location of the other rear deviations 230b and 250b on each side of the roof opening connected with the corresponding slides 350 and 390. Furthermore, when the roof panels are deployed towards their closed position above the passenger compartment, the inverse routing of the front slides of each panel tips the levers concerned into the return position, before the associated rear slider blocks are engaged in the corresponding deviations.

The intermediate central roof element is installed on the second groove 230 of the slide 700 by two slider blocks 330, 350 at a spacing equal to the length L. The first slider block 330 furthest forward from the roof element 3 is engaged in a deviation 230a facing forwards on the vehicle and downwards. This deviation 230a is located at the front end of the said second groove 230. The second slider block 350 furthest back from the roof intermediate element is also engaged in a second deviation 230b with the same orientation as the first and at the same distance from it equal to the same length L mentioned above. When the intermediate central roof is withdrawn backwards by the front central roof element 100, it is offset upwards due to the orientation of the first deviation 230a and the orientation of the second deviation 230b. The curvature of the corresponding groove 230 then enables the intermediate central roof element 300 to pass above the rear central roof element 500.

The roof element 500 is installed on a third groove 250 of the slide 700 by two slider blocks 370, 390 separated by a length L. The first slider block 370 furthest forward from the roof rear element is engaged in a deviation 250a oriented towards the front of the vehicle and downwards. This deviation is located at the front end of the said third groove 250 of the slide. The second slider block 390 furthest back from the roof rear element is also engaged in a second deviation 250b with the same orientation as the first and at the same length L from it. When the central roof element 500 is driven backwards by the front central roof element 100 and the intermediate central roof element 300, it is offset upwards due to the orientation of the first deviation 250a and the orientation of the said second deviation 250b, to offset the roof element 500 upwards.

The front edge 300a of the intermediate central roof element 300 comprises an arm 410 (also in FIG. 20) extending downwards and comprising a pin or a roller 430 at its lower end. When the front central roof element reaches the horizontal above the roof element 300 (FIG. 17), the hook 270 located on the front edge 100a of the front central roof element bears on the said pin. The hook then entrains this roof element 300 backwards and shifts it upwards along the two deviations 230a and 230b, to enable the intermediate central roof element to pass above the rear central roof element 500, the curvature of the slide 700 that extends upwards also allowing the roof element 100 to pass above the roof element 500.

Once the central roof elements 100, 300 and 500 are superposed approximately horizontal above and below each other (FIGS. 15 and 18), the roof rear element 900 is driven backwards by the arm 100, thus offsetting the front edge 900a of this roof element upwards, allowing passage of the central roof elements.

The front edge 500a of the rear central roof element 500 comprises an arm 450 (FIG. 16) extending downwards, and at its lower end comprising a pin or roller 470. When the intermediate central roof element 300 becomes horizontal above the rear central roof element, the hook 490 located on the front edge 300a of the intermediate central roof element bears on the said pin 470. The hook then pulls the roof element 500 backwards and offsets it upwards along the two deviations 250a and 250b to allow the roof rear element 500 to move upwards.

The central roof elements will then be driven along the slide 700 and along the pivoting slide 510 in an approximately vertical position in the boot or in the storage space 530 located behind the seats 550 in the vehicle furthest back in the passenger compartment 570. The mobile slide 510 extends along the back of seats 550 in this first vertical storage position of the roof elements 100, 300, 500. Once these central roof elements have been arranged vertically, the roof rear element 900 will tip backwards from its high position above the rear of the passenger compartment towards its storage position in the space 530, by means of the drive arm 110 guided by the slide 170 to come into an approximately horizontal position (mark 900 in dashed lines in FIG. 15).

The central roof elements 100, 300 and 500 are then in their approximately vertical position on the second slide 510 installed free to pivot on the chassis 130. This second slide thus pivots the central roof elements from a first storage position (in this case approximately vertical) to a second storage position (in this case approximately horizontal) that can be located in a compartment 610 at the back of the floor 630 of the boot, facing the storage space 530 (so-called approximately horizontal low position corresponding to mark A in FIG. 15). In this case, the second slide 510 is articulated to the structure 130 by a rotation axis 650 transverse to the longitudinal axis 190 of the vehicle located on the lower end 510a of the said second pivoting slide.

It is also possible to make the roof elements 100, 300 and 500 stored in their first position pivot to a second different storage position, in this case approximately horizontal under the rear window 9000 then itself in an approximately horizontal storage position (then called the high horizontal position corresponding to mark B in FIG. 15). The second slide 510 is then articulated to the chassis 130 by a rotation axis 670 transverse to the longitudinal axis 130 located on the upper end 510b of the pivoting slide 510.

It would also be possible to pivot the roof elements stored in their first approximately vertical position by a system of locks not shown, in one or the other of the said second high or low storage positions, by providing the two pivot axes 650, 670 on the slide 510, and acting selectively on one of the two locks.

Selective means such as a switch 200' connected to a cable 201' and a motor 203' itself connected to the part of the slide 510 concerned, can be used to control the movement of the roof parts concerned at will between their vertical and horizontal storage positions.

It would also be possible to tip the rear back of seats 550 forwards into an approximately horizontal position (see mark 550 in dashed lines in FIG. 15), thus increasing the volume of the boot. It would also be possible to envisage a solution using a second slide such as 510 fixed to the seat back pivoting forwards and thus positioning the roof elements stored in an approximately horizontal position above the seat back.

Figure 22:
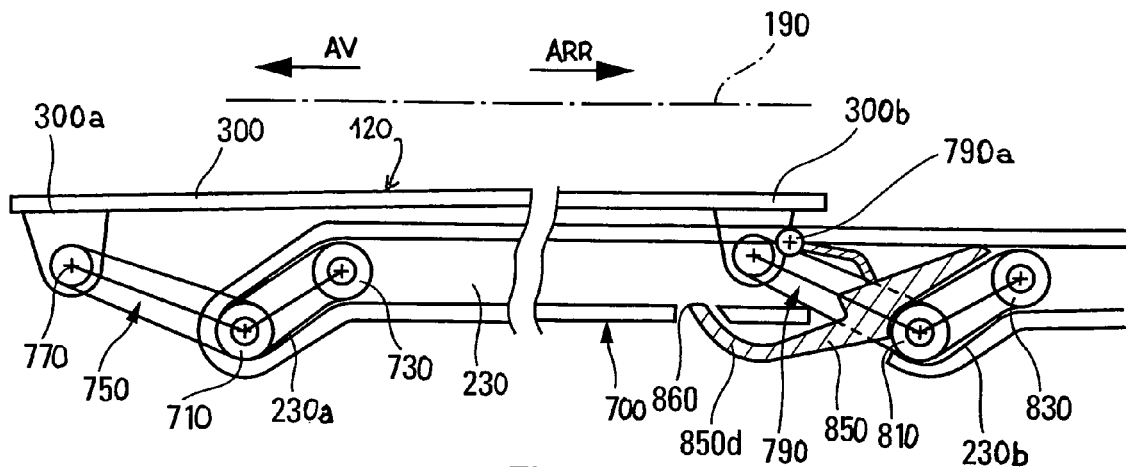
FIGS. 22, 23, 24 illustrate superpositions of roof elements in FIG. 15 and subsequent figures, according to another embodiment.
Figure 23:
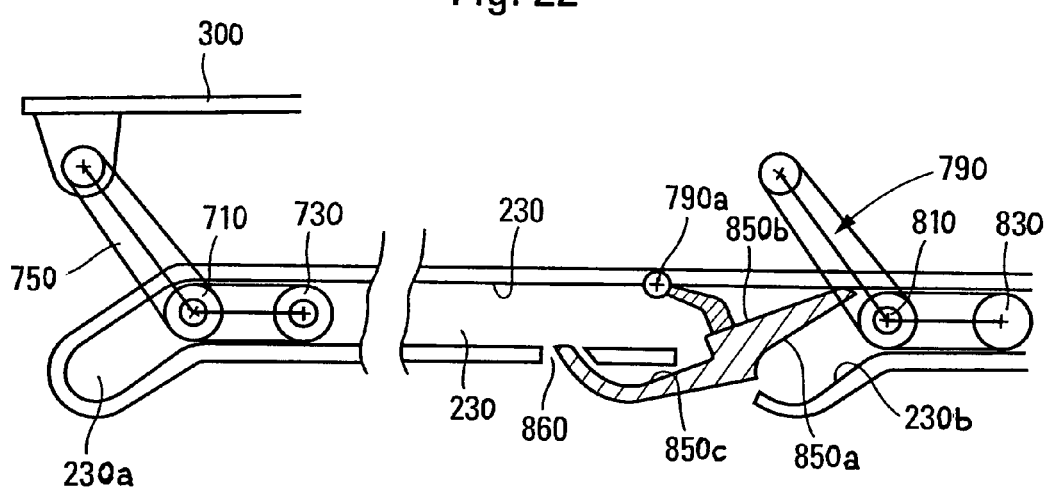
Figure 24:
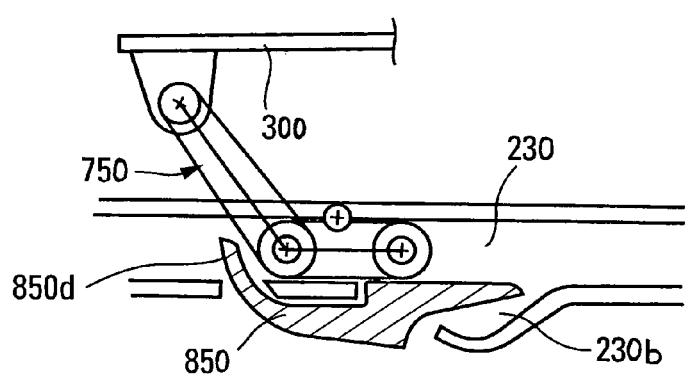

In the embodiment illustrated in FIGS. 22 to 24, the roof front element 100 is superposed on the roof intermediate element and the roof front element and roof intermediate elements are superposed on the roof rear element as described with relation to FIG. 15.

The principle of lifting a roof to enable it to move above another roof in a superposed position will be described in relation to lifting the roof intermediate element 300 passing above the roof rear element 500.

The roof intermediate element 300 is installed free to slide in a second groove 230 of the slide 700. This roof intermediate element is engaged in this groove 230 by two slider blocks 710, 730. These two slider blocks are fixed to the roof element 300 by a cranked arm (or lever) 750 belonging to a front group of levers. This arm is articulated to the roof element 300 by a rotation axis 770 transverse to the longitudinal axis 190.

The first cranked arm 750 is located on the front edge 300a of the roof intermediate element and a second cranked articulated arm (or lever) 790 is located on the rear edge 300b of the roof intermediate element 300. For the panel 300, the articulated arm 790 belongs to a rear group of levers. When this roof element is in its closed position and tipped downwards to be the same level as the roof front element 100 and the roof rear element 500, the slides 710, 730 of the front elbow 750 are engaged in the deviation 230a. The front part of the roof intermediate element 300 is then in its low position (FIG. 22).

Other slider blocks 810 and 830 related to the cranked arm 790 located on the rear edge 300b of the roof element 300 are also engaged in the second deviation (rear) 230b. Thus, when the slider blocks 810 830 are engaged in the deviation 230b, the rear part of the roof intermediate element is still in its low position.

A pivoting element or a tipping lever 850 can guide the passage of slider blocks 710, 730 above the deviation 230b, in the direction to open or to close the roof intermediate element. This same pivoting element can also guide the passage of the slider blocks 810 in the same deviation 230b. The pivoting means 850 is articulated about an axis 790a transverse to the longitudinal axis of the vehicle that is located on the upper edge 230' of the groove 230. The rocker 850 comprises three guide surfaces 850a, 850b, 850c. A first surface 850a guides the slider blocks 810, 830 in the deviation 230b, the surface 850b guides the passage of slider blocks 710, 730 above this same deviation 230b, when the roof intermediate element slides forwards or when it slides backwards. When the roof intermediate element slides forwards, the third surface 850c with its cranked front edge 850d passing through the opening 860 of the slide 230, tips the lever 850 above the slide and positions the surface 850a in its high position shown in FIGS. 22 and 23, so as to enable the slider blocks 810, 830 of the rear elbow 790 to engage in the said second deviation 230b (FIG. 22).

When the front, intermediate and roof rear elements are in their closed position, approximately in line one behind the other, they are locked by sliding means fixed to the structure 130 of the vehicle.

In the example shown, the locking hooks 100', 101', 103' lock at least one slider block (310, 350, 390) on each roof element. These three hooks are entrained in the backwards or forwards direction to enable locking or unlocking of roof elements by a rod 105 that moves parallel to the slide 700. This rod itself is driven by known means such as one or several flexible cables.

The first hook 100 with length d located furthest forward on the rod lock the second slider block 310 furthest back from the front central roof element, which is engaged in the second deviation 210b of the first groove.

The second longer hook 101 (for example with length 2d) located approximately in the middle of the rod 105 locks the second slider block 350 furthest back on the intermediate central roof element 500 that is engaged in the deviation 230b.

The third hook 103, for example with length 3d, located approximately behind the first and second hooks of the rod, locks the second slider block 390 furthest back from the rear central roof element 500, that is engaged in the second deviation 250b in the third groove.

When the front central roof element 100 slides backwards to be superposed with the roof element 300, the first hook will unlock the second slider block of the front central roof element, by moving backwards over a length d. The intermediate and rear central roof elements then remain in the locked position with respect to the slide by the second and third locking hooks. The reasoning is the same during superposition of two and then three roof central elements, this final step enabling storage of roof elements in the rear storage space.

One or several rigid roof elements or rigid panels may be concerned in the above, in addition to the rear window (as a reminder, mark 5 in FIG. 1 and 900 in FIG. 15), and it is clear that the mechanism in FIGS. 22 to 24 is not reserved solely for a roof with pivoting arms like that shown in the first figures.

The invention claimed is:

1. A convertible vehicle having a front and a back and comprising a bodywork, a passenger compartment, a boot, a windscreen and a roof movable with respect to said bodywork, the roof comprising:

a roof front element and a roof rear element, both movable between a covering position in which they cover the passenger compartment and a storage position inside the boot, arms installed to pivot on the roof rear element between the covering position in which they extend between a front end of the roof rear element and a back of the windscreen, on each side of and along the roof front element, and the storage position in which they overlap transversally with respect to a plane of symmetry of the vehicle, wherein the arms pivot about non-parallel rotation axes.

2. The vehicle according to claim 1, wherein the roof further comprises at least one roof intermediate element movable between said covering position and said storage position, and interposed between the roof front element and the roof rear element in the covering position, the arms extending in said covering position on each side and along both the roof front element and the roof intermediate element.

3. The vehicle according to claim 1, wherein said arms include two arms, each of said arms being so installed to pivot on the roof rear element between the covering position in which it extends between said front end of the roof rear element and the back of the windscreen, one on each side of the roof front element and along said roof front element.

4. The vehicle according to claim 1, wherein the roof front element comprises first locking means for releasably locking it to the arms, and each arm comprises second locking means for releasably locking it with respect to the windscreen.

5. The vehicle according to claim 4, wherein the first and second locking means are controlled by driving rods extending inside the arms and driven in rotation by motor drive means.

6. The vehicle according to claim 1, wherein displacement of the roof rear element is controlled:

by a slide extending inside the boot in which a pin is engaged fixed to a rear part of the roof rear element, and by a pivoting lever arm articulated at one side at a fixed point on the vehicle bodywork and, at another side, to said roof rear element.

7. The vehicle according to claim 2, wherein:

the roof front element is connected to the at least one roof intermediate element by at least two first levers, each of said first levers being articulated to said roof front element and to said roof intermediate element, and the at least one roof intermediate element is connected to the roof rear element by at least two second levers, each of said second levers being articulated to said at least one roof intermediate element and to said roof rear element.

8. The vehicle according to claim 3, wherein:

the roof further comprises at least one roof intermediate element movable between said covering position and said storage position, and interposed between the roof front element and the roof rear element in the covering position, the arms extending in said covering position on each side and along both the roof front element and the at least one roof intermediate element, and two series of superposed lateral slides extend along the arms and along two inner lateral parts of the roof rear element, in the covering position, for displacement of the roof front and intermediate elements.

9. A convertible vehicle having a longitudinal axis, a front and a back and comprising a bodywork, a passenger compartment, a boot, a windscreen and a roof movable with respect to said bodywork, wherein:

the roof comprises a roof front element and a roof rear element, both being free to move between a covering position in which they cover the passenger compartment and a storage position in which the roof front and rear elements are stored in said boot, one of the roof front element and the roof rear element comprises a group of front levers and a group of rear levers articulated with respect to said one of the roof front element and roof rear element, to move between:

a first position in which at least one of said roof front element and roof rear element is substantially flush with at least one of a surrounding part of the vehicle bodywork and the other of said roof front and rear elements, and a second position in which said at least one of roof front element and roof rear element is offset in height from the first flush position, and the groups of levers engage guiding means extending essentially and substantially parallel to said longitudinal direction, the guiding means being adapted:

during a controlled backwards displacement of the groups of levers, to guide them for displacing said at least one of the roof front element and the roof rear element from the first flush position to the second offset position, and during a controlled forwards displacement of said groups of levers, to guide them for displacing said at least one of the roof front element and the roof rear element from the second offset position to the first flush position, each guiding means along which said one of the roof front element and the roof rear element slides, has at least one front inclination facing downwards over a length thereof, and a second rear inclination also facing downwards, wherein access by anyone of the rear levers to the second corresponding rear inclination depends on the position of a rocker located in the corresponding guiding means and which:

in a first position, prevents access of the second rear inclination and therefore imposes displacement of said corresponding roof element in said second offset position, and in a second position, enables said rear lever of the roof element to penetrate into the second rear inclination, in a first direction of displacement, and to come out therefrom, in a second, opposite direction of displacement.

10. The vehicle according to claim 9, wherein said front and rear inclinations are separated longitudinally by a distance corresponding to a longitudinal spacing between the front and rear levers, such that said levers can be engaged therewith, in said first position of the corresponding roof element, and disengaged therefrom when said roof element is moving backwards.

11. The vehicle according to claim 9, wherein:

in the first position, the rocker is in line with the corresponding guiding means and supports the corresponding rear lever when it passes thereon, and in its second position, said rocker is inclined and extends across said corresponding guiding means.

12. The vehicle according to claim 9, wherein the guiding means comprise slides in which said groups of levers slide, the slides locally including deviations extending obliquely from the horizontal and from said longitudinal direction, over a sufficient length so that each slide can individually hold part of one of said groups of levers, such that once engaged in said deviations, the corresponding group of levers pivot from one of its first and second positions to the other of said positions.

13. The vehicle according to claim 9, wherein:

a front portion of each rocker extends and rocks under the corresponding guiding means, in front of the second rear inclination, said front portion having a front edge cranked upwards which, during tilting, passes through an opening formed in said guiding means to engage the front lever of the corresponding roof element and a rear portion of each rocker has a lower surface defining a part of the contour of said second rear inclination, in the second position of the rocker.

14. The vehicle according to claim 9, further comprising pivoting arms installed to pivot on the roof rear element, between the covering position in which they extend on each side of and along the roof front element, and the storage position in which they overlap transversally to the longitudinal axis of the vehicle, the roof front element comprising first locking means for releasably locking it to said pivoting arms, and each of the pivoting arms comprises second locking means for releasably locking it with respect to the vehicle windscreen.

15. The vehicle according to claim 14, wherein said pivoting arms are installed to pivot about non-parallel rotation axes, on the roof rear element.

16. The vehicle according to claim 15, wherein said pivoting arms include two pivoting arms, each of said pivoting arms being so installed free to pivot on the roof rear element between said covering position in which it extends between a front end of the roof rear element and a back of the windscreen, one on each side of the roof front element and along said roof front element.

17. The vehicle according to claim 14, further comprising a common motor drive means for driving the first and second locking means and pivoting the arms.

18. The vehicle according to claim 9, wherein displacement of the roof rear element is controlled by a slide extending inside the boot and in which is engaged a pin fixed to a rear part of said roof rear element, and by a pivoting lever arm articulated at one side to a fixed point on said vehicle bodywork and at an other side to said roof rear element.

19. The vehicle according to claim 16, further comprising a roof intermediate element, the roof front element being connected thereto by at least two first levers articulated to said roof front element and to the roof intermediate element, and the roof intermediate element is connected to the roof rear element by at least two second levers articulated to said roof intermediate element and to the roof rear element.

20. The vehicle according to claim 16, wherein:
the roof further comprises a roof intermediate element movable between said covering position and said storage position, and interposed between the roof front element and the roof rear element,
in the covering position, the arms extend on each side and along both the roof front element and the roof intermediate element,
two series of lateral slides are superposed for displacing the roof front and intermediate elements therealong,
and said lateral slides extend along the arms and along two inner lateral parts of the roof rear element, in the covering position thereof.

* * * * *